(12) United States Patent  
Weidenheimer et al.

(10) Patent No.: US 7,893,561 B2
(45) Date of Patent: Feb. 22, 2011

(54) MODULAR ELECTRONICALLY RECONFIGURABLE BATTERY SYSTEM

(75) Inventors: Douglas M. Weidenheimer, Brentwood, CA (US); Kevin J. Donegan, Wilton, NY (US); David Wayne Morton, San Leandro, CA (US)

(73) Assignee: L-3 Communications Titan Corporation, Reston, VA (US)

( * ) Notice: Subject to any disclaimer, the term of this patent is extended or adjusted under 35 U.S.C. 154(b) by 1013 days.

(21) Appl. No.: 11/483,173

(22) Filed: Jul. 10, 2006

(65) Prior Publication Data

US 2007/0062744 A1    Mar. 22, 2007

Related U.S. Application Data

(63) Continuation-in-part of application No. 10/631,017, filed on Jul. 31, 2003, now Pat. No. 7,075,194.

(51) Int. Cl.  
*H02J 1/00* (2006.01)

(52) U.S. Cl. .......................................... 307/71
(58) Field of Classification Search .............. 307/71, 307/9.1  
See application file for complete search history.

(56) References Cited

U.S. PATENT DOCUMENTS

| 3,923,116 | A | 12/1975 | Thompson et al. |
| RE29,579 | E | 3/1978 | Simon |
| 4,412,137 | A | 10/1983 | Hansen et al. |
| 5,121,046 | A | 6/1992 | McCullough |
| 5,654,881 | A | 8/1997 | Albrecht et al. |
| 5,660,246 | A | 8/1997 | Kaman |
| 5,900,697 | A | 5/1999 | Toda |
| 6,147,845 | A | 11/2000 | Matsubara et al. |
| 6,430,692 | B1 * | 8/2002 | Kimble et al. ............. 713/300 |
| 6,459,175 | B1 | 10/2002 | Potega |
| 6,465,931 | B2 | 10/2002 | Knowles et al. |
| 6,703,722 | B2 | 3/2004 | Christensen |
| 6,731,022 | B2 * | 5/2004 | Silverman .................. 307/43 |
| 6,787,204 | B2 | 9/2004 | Chaussade et al. |

(Continued)

FOREIGN PATENT DOCUMENTS

EP          0 397 102 A2    11/1990

*Primary Examiner*—Robert L. DeBeradinis  
(74) *Attorney, Agent, or Firm*—Rothwell, Figg, Ernst & Manbeck, P.C.

(57) ABSTRACT

An electronically reconfigurable battery includes a number of battery modules selectively interconnected by a number of electronic switches, wherein a selectable number of battery modules may be connected either in a series configuration or in a parallel configuration, as a result of placing selected switches of said plurality of switches in open states or closed states. In a parallel configuration, the battery provides power to a primary load, such as a propulsion load for a vehicle. In a series configuration, the battery is configured to provide a high voltage and high power output to a short-term and/or pulsed load, such as an additional load provided on the vehicle. Current from the battery is limited in one of three ways: a) by the batteries themselves; b) a current limiting device or system in series with the total erected battery; or c) a single level power converter or current limiter that is used to erect and charge the capacitor bank in a sequential one level at a time manner until the battery is fully erected and the capacitor is fully charged.

25 Claims, 9 Drawing Sheets

U.S. PATENT DOCUMENTS

| | | |
|---|---|---|
| 6,876,163 B2 | 4/2005 | Zack et al. |
| 7,075,194 B2 * | 7/2006 | Weidenheimer et al. ...... 307/71 |
| 7,265,522 B2 * | 9/2007 | Sutardja et al. ............ 323/222 |
| 2002/0179349 A1 | 12/2002 | Field |
| 2003/0000759 A1 | 1/2003 | Schmitz et al. |
| 2004/0177284 A1 * | 9/2004 | Chin et al. .................. 713/300 |

* cited by examiner

ERB with Current limiting Device inserted between the Dynamic Battery Store and Static Battery Store. Following Examples is a 10000 Volt ERB with 1000 Volt battery stages configuration ERB with Single Stage Converter Block inserted between the Dynamic Store and Static Store portions of the battery 10.5 kV ERB with a single stage Buck/Boost converter.

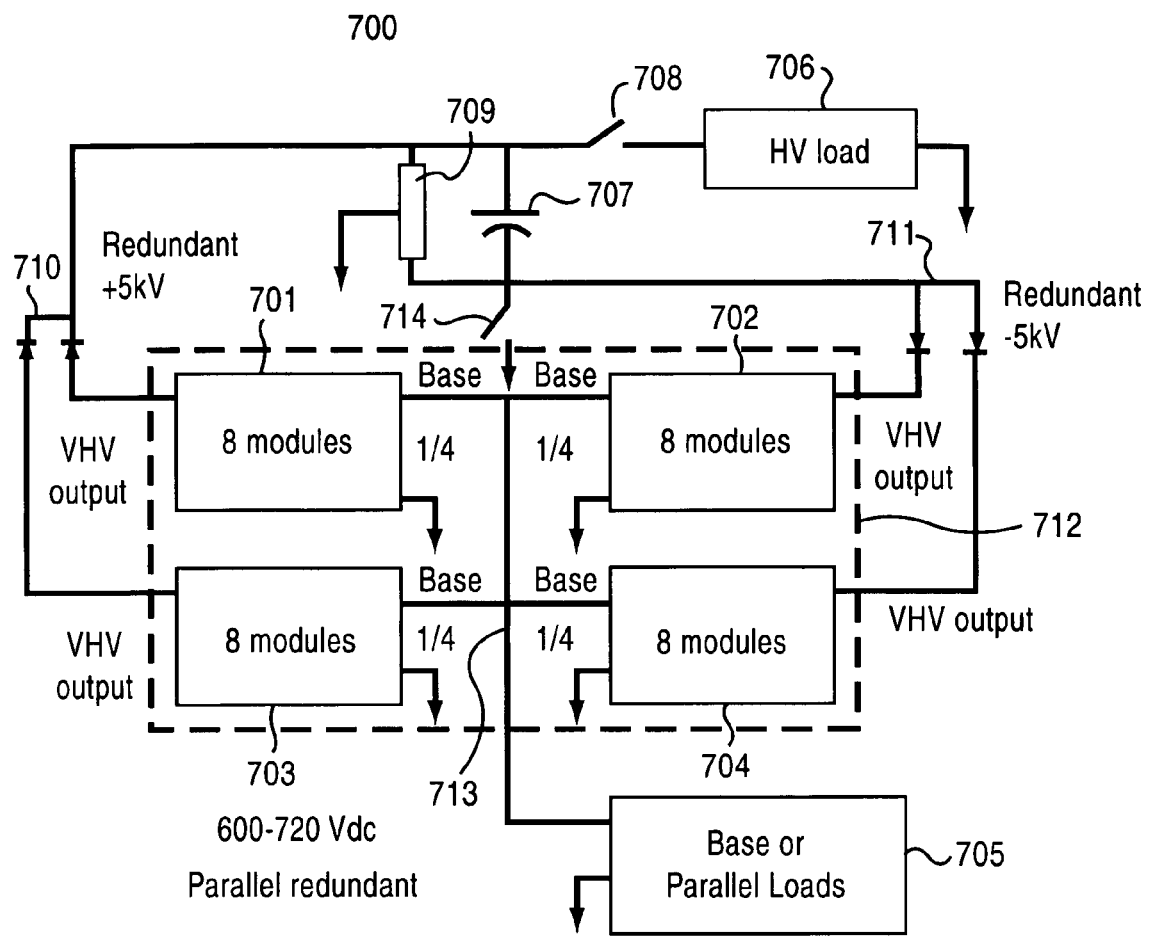
FIG. 7  Simplified H & Star configuration ERBs

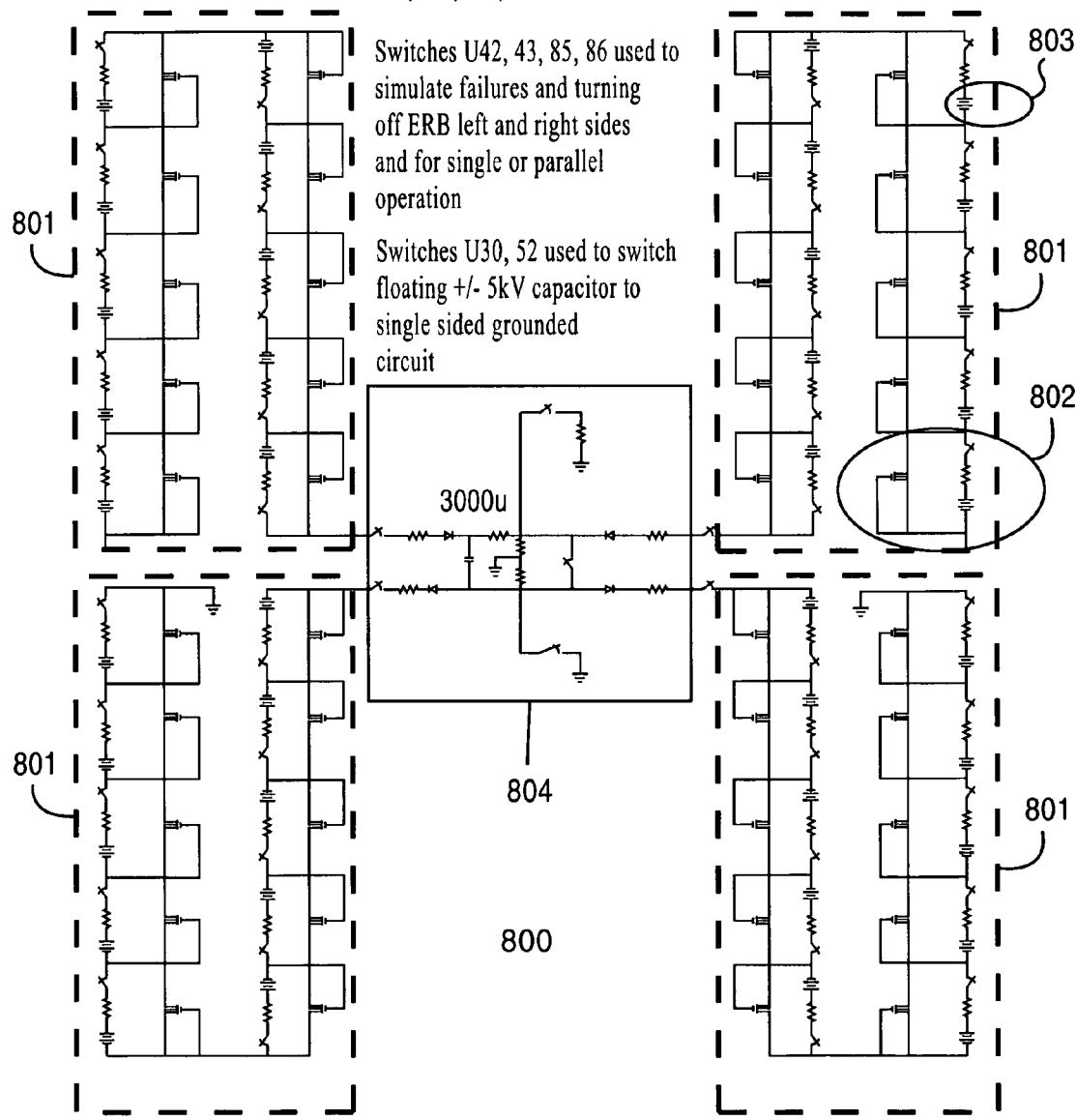
FIG.8  H Configurate ERB

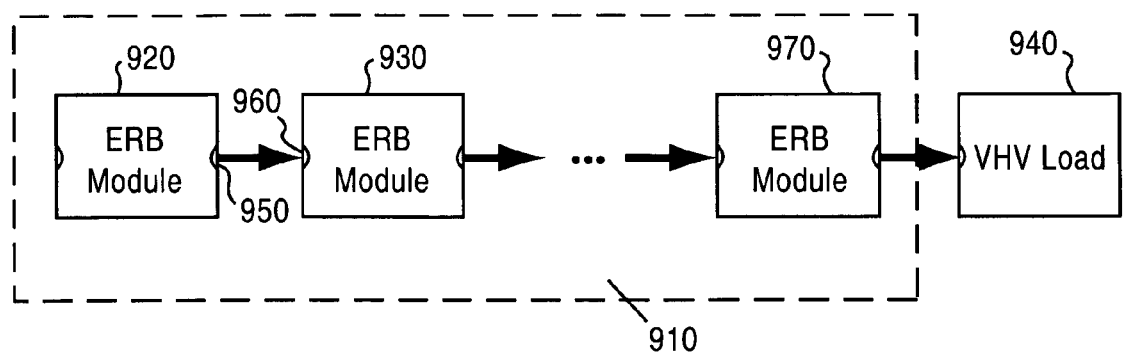
FIG. 9  Scalable ERB Arm connected to VHV load

MODULAR ELECTRONICALLY RECONFIGURABLE BATTERY SYSTEM

CROSS-REFERENCE TO RELATED APPLICATIONS

This application claims priority to and is a continuation-in-part of U.S. patent application Ser. No. 10/631,017, filed on Jul. 31, 2003, the entire contents of which are incorporated herein by reference.

BACKGROUND OF THE INVENTION

1. Field of the Invention

The present invention relates to electrical energy storage systems and, in particular, to battery packs composed of multiple battery modules with adjustable configurations.

2. Description of the Related Art

Hybrid electric vehicles (HEVs), hybrid electric ships and boats (such as the QE2) afford greater fuel efficiency than vehicles or vessels having only a prime mover (e.g., diesel or gasoline engine, gas turbine and fuel cell). Greater efficiency is obtained by using an energy store to level the load on the prime mover-providing peaking power to an electric motor, or storing energy during low power prime mover operation or during regenerative braking.

A well-developed form of energy storage for this application is a battery pack, and there are several candidate battery chemistry systems that may be utilized. Of these systems, the lithium-ion (Li-ion) technology is the most energy and power dense. Li-ion cell technology for this application is currently capable of energy density of up to 134 W-hr (482 kJ) per kg (HE40 cell), and a power density of up to 13 kW per kg (e.g., HP18650 cell short duration, manufactured by SAFT AMERICA).

Vehicle battery packs sized for multiple military combat missions, (such as the Combat Hybrid Power Systems (CHPS) Systems Integration Lab (SIL) battery pack) store approximately 108 MJ (30 kW-hr). If the highest power density SAFT cells (HP18650) are utilized, then the short duration power capability of the battery pack would be greater than 4 MW.

Such a peak power capability could enhance both offensive and defensive capabilities if it were easily convertible to voltages commensurate with a range of potential short-term and pulsed loads. For example, Electromagnetic Armor (EMA) provides lightweight protection to combat vehicles against rocket-propelled grenade attacks. The energy required for the EMA to function is stored in a fast discharge capacitor bank, which is recharged either from a generator operated by the prime mover of the vehicle, or from an intermediate energy storage system. In a HEV, the electric energy battery pack also could function as such an intermediate energy storage system. However, in order to provide the approximately 10 kV needed as the input voltage to the capacitor bank, a DC-DC power converter is needed between the intermediate energy storage system and the capacitor bank.

The traditional methods for DC-DC power conversion typically involve the use of inverters and heavy-duty transformers. Current EMA designs require approximately 150 kJ to recharge the capacitor bank. At 3 pulses per second (pps) operation, even for a short period of time, the recharge time would have to be on the order of 300 ms. Consequently, the recharge power would have to be on the order of 500 kW average, or 1 MW peak. However, a 1 MW peak power traditional DC-DC converter, using present technology, would add more volume and mass to the vehicle platform than is allowable in a 16-20 ton class vehicle.

Thus, there exists a need in the art for a system power density improvement in producing short term high power at high voltages from a battery pack normally configured to provide hybrid vehicle prime mover load leveling and/or silent mobility capability or in other fixed or moving battery platforms such as battery backpack systems or pulsed energy weapons or launch systems.

SUMMARY OF THE INVENTION

The present invention provides an alternative method for converting DC from bus voltage to a voltage that is compatible with various loads. According to the present invention, a battery pack is electronically re-configured to produce multiples of a bus voltage, momentarily and on command. Such a battery pack would be configured in modules that are equal to the power distribution bus voltage. The entire battery pack, or some fraction thereof, can be erected and de-erected on command, analogous to the operation of a Marx generator (commonly used for capacitive voltage multiplication).

According to embodiments of the present invention, the need for intermediate DC-DC power conversion circuitry is reduced or eliminated by using electronic switching to convert the battery pack modules from their normal parallel configuration for vehicle or ship load leveling and/or silent mobility functions, to a series configuration that is capable of delivering the necessary high power and high voltage output for short-term and pulsed load operations.

In particular, according to a first preferred embodiment, the present invention provides an electronically reconfigurable battery, including a first number of battery modules, a number of switches selectively interconnecting the battery modules, wherein a selectable number of the battery modules may be connected either in a series configuration or in a parallel configuration, as a result of placing selected switches of the switches in open states or closed states, and an output switch connecting a first output terminal of the battery to a first load. DC current flow is limited and controlled by electrochemical DC current discharge characteristics of the battery technology used, such as in the case of lithium-ion (Li-ion) technology.

In another embodiment of the present invention, an electronically reconfigurable battery includes a first number of battery modules, a number of switches selectively interconnecting the battery modules, and a current limiting section or a current limiting DC-DC converter, wherein a selectable number of the battery modules may be connected either in a series configuration or in a parallel configuration, as a result of placing selected ones of the switches in open states or in closed states, and an output switch connecting a first output terminal of the battery to a first load.

The DC current limiting device can be used to control the current outside the range of the electrochemical DC current discharge characteristics of the battery technology used. A parallel operation DC by-pass switch is optionally incorporated within the current limiting section dependent on the technology used and where the section is located at the beginning or end of the series connected batteries. A simple example of this current limiting section is a series connected power resistor, or inductor connected in series between the high voltage battery end terminal and a Pulse Forming Network capacitor bank (commonly known as a PFN capacitor) forming the resistive, the inductive or resonant capacitor charging circuit.

According to another embodiment of the present invention, an electronically reconfigurable battery includes a first number of battery modules, a number of switches selectively interconnecting the battery modules, a single stage current limiting section or a single stage current limiting DC-DC converter (hereinafter referred to as a single stage converter or SSC). The SSC may take the form of a resistor or inductor or a reduced size electronic DC-DC converter using some form of Buck, Boost, Buck/Boost or Resonate or inductive converter topology, wherein a selectable number of the battery modules may be connected either in a sequential series configuration operation or in a parallel configuration, as a result of placing selected switches of the switches in open states or closed states, and an output switch connecting a first output terminal of the battery to a first load.

A DC current limiting device can be used to control the current outside the range of the electrochemical DC current discharge characteristics of the battery technology used. A parallel operation DC by-pass switch is optionally incorporated within the current limiting section dependent on the technology used and whether the section is located at the beginning, end or middle of the series connected batteries.

According to another embodiment of the present invention, the system may be configured to be redundant and fault tolerant in most applications and is capable of bidirectional power flow. Additionally, the system can be built in either a discrete or stackable modular form. The system may include one or more voltage scalable arms that are configured in a "star" or "H" configuration with switch steering matrixes both in the inner and outer portions of the star configurations. These switching arrays can also be used to cross-connect multiple star configurations and isolate the loads from the ERB sections. The multiple arms may be connected at one end for the parallel Low voltage or Baseline Voltage operation using inner (base) switch matrix or direct hardwired connected between the multiple arms. The other end of each arm is connected to the Series or variable high voltage (VHV) connection. The energy from the base side connection of each arm is fed in parallel to the center switch matrix primarily to provide traction power or the main system load. This voltage is normally fixed at the module's base voltage level. The Energy stored in the arm can also be directed to flow out the opposite end of the each arm through the VHV connection into an outer switch matrix or multiple outer switch matrixes at different voltage levels that connects to auxiliary loads or pulse power loads. The Energy flow is in discrete energy packets that are time multiplexed on the VHV connection side while maintaining a continuous connection and energy flow through the base or parallel connection side. The modules can be erected and de-erected at high speed in series and parallel combinations allowing the VHV output to be continuous, or rising stair case step voltage or a pulsed voltage and energy output. Thus, the VHV output connection is allowed to charge and transfer energy from the base voltage energy storage system through the VHV steering matrixes to much higher voltage energy storage systems located at or near the auxiliary high voltage loads.

Each arm may be composed of a group of smart reconfigurable identical energy modules that each contain, in the least: a base power source, such as 720 Volt battery stack; a stackable intermediate pass-through switch matrix; an inter-module interconnect bus bar system; protection systems; and a distributed control system. The modules in each arm can be electronically reconfigured themselves to connect in parallel to the parallel inner bus structure at the base voltage or to be disconnected from the parallel inner bus structure. Additionally, the modules can be configured to transfer and redirect energy out of the VHV connection into the multiple output switch or output steering matrixes to the auxiliary HV energy stores by and raising the voltage and pulsing the energy out of the VHV connection.

The energy packets can be controlled in two dimensions: discrete voltage steps and time. The variable voltage has discrete voltage steps that are the same voltage level as the individual module stages; the number of steps is determined by the number of modules. The VHV voltage can be raised to the value of the base voltage multiplied by the number of modules in the arm connected in series. Each module can have two high power input and two high power output connections, a digital communication port or ports, and an auxiliary power input.

Notably, this system is substantially different from other reconfigurable battery or energy sources in that the series parallel switch matrix and bus bars are an integral part of the module and it can function as a "plug and play" system with modules in parallel mode of operation with two arms in parallel as clearly detailed in FIG. 8. That is, any of the modular diagrams FIGS. 1-6 can be used in FIG. 7 or 8 configurations. FIGS. 1-6 also show only the positive output version of the arm connections. For negative output arm connection simply the input and output connection are reversed as shown in detail H configuration FIG. 8 and move the current limiting or active conditioning systems as shown in FIGS. 2-5 to the opposite end.

For positive output, the base or the parallel input shown in FIGS. 7-8 are the same input or low voltage parallel connection as static store connections (207) of FIG. 2. Vehicle mobility battery and loads as shown in FIG. 3. Static store (442) in FIG. 4. the static store connection of FIGS. 5 and 6

Each of the single arm configurations shown in FIGS. 1-6 have a single diode HV matrix switch, labeled D1 built into the end module the diode located in the last module and at the end of the High voltage chain or arm. The connection at cathode end of the diode is the normal HV output. In FIGS. 8-9, and the diode matrix is external to the modules, resulting in identical modules.

Thus, the maximum voltage can be changed by adding or subtracting plug in module without any bus bar or switch matrix changes. For example, a four arm "star" configuration—the "H" configuration—has one end of each arm connected in parallel at the center of the star connected to the 720 volt traction drive system and four outer ends of the arms creating two +5.7 Kilovolt variable voltage sources and two −5.7 Kilovolt sources. The outer steering switch matrix in this case can include 4 high voltage diodes and two pairs of arms are essential in parallel for redundancy for continued operation after sustaining faults or battle damage. The 11.4 kV (kilovolt) differential voltages are used to charge a 150 kJ pulsed power 10 kV capacitor bank. Each arm consists of 8 modules which translates to 32 (i.e. 8×2×2) modules in parallel operation. When used in a high performance traction drive, the energy packets can be time multiplexed between the drive system and erecting the 11.4 Kv pulsed power system. Total elapsed time for charging the capacitor bank is under 500 milliseconds.

In a more complex embodiment, with additional arms and sophisticated output load switch matrix added, energy packets can deliver energy to loads between 720 and 5.7 kV. Using the same modules, the system is scaled up to a 30 kV pulsed power application by simply adding more modules in series.

There are several differences between this system and other reconfigurable battery systems that have been around since the first battery powered trucks and cars. First, this system is designed for at least two output or loads that have different voltage requirements. Second, this topology is based on a "Star or H" Configuration with multiple reconfigurable energy storage and production arms with multiple time multiplexed outputs. Finally, there is an inner and outer switch matrix for controlling and directing the voltage and energy an intermediate switch matrix that is distributed among the modules each module contains the battery pack or energy source, the switch gear and bus work.

This more complex reconfigurable electrical energy storage system is especially useful in hybrid electric vehicles, ships, or boats (i.e., vehicles, ships, or boats powered by both a prime mover and an electrical energy power source) used in military operations and in other fixed or moving platforms where it is desirable to be able to redirect and level shift the stored energy in the reconfigurable electrical energy storage system to auxiliary higher voltage energy storage and deliver systems such as pulsed power weapon and protection systems. Examples of such reconfigurations include a shift from a low voltage parallel configuration to high voltage series/parallel configurations for optimizing impedance match, minimizing or eliminating the need for an associated power converter for pulsed power applications, powering other subsystems or matching variable DC link main systems as envisioned in, for instance, the original CHPS combat hybrid vehicle, which shifted from a 300-400V low voltage parade voltage to a higher 900-1200V combat status bus voltage.

Another embodiment of the present invention employs a modular scalable electric power distribution topology having multiple outputs to transfer energy and power between loads and sources of different operating voltages simultaneously. This transfer can occur in either a continuous or time multiplexed manner consisting of one or more reconfigurable energy storage or production ERB arms connected in the ""star or H"" configuration. Each of the two ends of an ERB arm has a bidirectional power output connection referred to as the base or parallel output connection and the high variable high voltage (VHV) output connection.

Three switch or steering matrix arrays can be used for directing and controlling the energy flow. The first array includes an inner or base switching array located at the center of the star configuration for parallel combinations of the parallel or base voltage. The second array includes an intermediate switching matrix array distributed along each arm in the modular sections for parallel and series module combinations. The third array includes an output matrix or steering array or arrays to direct the VHV output from each ERB arm. The VHV array connects the multiple arms of the VHV outputs to the various multiple auxiliary storage systems or loads at voltages higher than the center base voltage.

Each energy storage or production ERB arm consists of a building block modular system in discrete or modular form consisting of multiple identical interface modules. The ERB modules contain an energy storage device such as a battery or capacitor or an energy production or transformation module such as a fuel cell or a power conversion device such as a solid state converter as shown in the text body. Additionally, each ERB module contains a piece of the distributed modular intermediate bus structure and switch matrix steering array as well as a part of the distributed control system and algorithms to prevent faults, misconnections and catastrophic failures due to mistiming of switch elements.

Another embodiment of the present invention may employ a method of transferring energy from one voltage and intermediate energy storage or energy production system to a higher or lower voltage energy storage system or load.

Another embodiment employs a simple switching algorithm and a three switch and one diode configuration that guarantees no catastrophic battery or fire failures due to mistiming of the in high speed switching or modulating of the series connection switches in the intermediated switch array. This is accomplished by switching off or opening all of the positive and negative rail switches rail switches labeled P and N in simplified parallel operation diagram, then using just the one series switch connection labeled S and one Required steering diodes per module allows seamless high speed erecting and de-erecting of the batteries or capacitors in series or series voltage stepped VHV Output by selecting the number of series switches turned on or sequenced with no critical timing issues.

In another embodiment the base switch matrix can be effectively set to 'ON' at all times by replacing the switch matrix with hard wired parallel connections of the base voltage terminals of the ERB Arms. One notable improvement of this invention over the prior art is that it allows simple scaling of more by the simple addition of more modules without any rewiring due to its modular and scalar design. Sophisticated ERB systems with complete redundancy of the ERB star and multiple star configurations are easily configured by switched in and cross connected at the base and/or at the VHV level matrix levels.

In an alternative embodiment, VHV outputs can be steered in parallel operation through a simple VHV diode steering array. This allows complete or partial failure of one more ERB arms without rendering the system inoperative. Two sets of two arms each supply energy in parallel to the 10 Kv 150 kJ energy storage capacitor. As a result, the system can suffer a complete failure of one plus and one minus output ERB arm and still meet VHV mission requirements. Furthermore, the system can suffer the loss of three ERB arms before losing traction or moving capability. A multiple arms configuration, such as the "star" or "H", is a great improvement over the single arm ERB configuration because parallel operation battery source resistance or ESR (Equivalent series resistance) is reduced by a factor of 4, or the number of arms in parallel.

In an alternative embodiment the ERB module can be "plug and play". In this form, the module consists of a stand alone self contained module with simple power two input port connections and two output power connections. The energy source, part of the modular distributed series and parallel switch matrix and bus bar system, fusing and protection and control system are all internal to the module. The Power ports can be directly connected to another module. In each ERB arm, first designated module input ports are connected to the base or parallel operation bus or matrix. The output of the first module is connected to the input of the second module in the module string in the ERB arm continuing in this fashion until the last module in the string is connected and the output port connection now become the VHV connection to the VHV steering array. Very high voltages can be achieved in this fashion, and 30-40 kv systems can be designed using this building block approach. Because of its scalability, the number of modules per ERB arm is application driven and, in a multiple arm ERM "star" configuration system, each arm may have a different number of modules and have a different polarization an output voltage to satisfy a wide variety of load requirements.

In another embodiment nested ERB are used. Nested, or layered, ERB are ERB systems with nested or layered ERB are contained within each level of stackable modules. The next level of ERB is to use an ERB within the ERB module to reduce the base voltage and basic module voltage. An example is reducing a 720 volts ERB module to a lower voltage 36 volts ERB module using ten (10) sub ERB modules within each 720 volt ERB module. The advantage is it allows the Base voltage to be dropped and allows a finer resolution in the high voltage output example 10 sub modules×8 modules=80 voltage steps resolution in the VHV output. This allows the Base current in parallel operation to be teri times higher for high torque low speed application or to create long life parade ground low voltage power and shorter life high speed combat modes.

The reconfigurable electrical energy storage system may combine one or all one or all of the above-mentioned features.

Further applications and advantages of various embodiments of the present invention are discussed below with reference to the drawing Figs.

BRIEF DESCRIPTION OF THE DRAWINGS

FIG. 7 is a schematic diagram of a simplified "H" or "star" configuration ERB system according to an embodiment of the present invention.

FIG. 8 is an illustration of an "H" configuration ERB system according to an embodiment of the present invention.

FIG. 9 is a schematic view of a scalable ERB arm for use in an "H" or "star" configuration ERB system according to an embodiment of the present invention.

DETAILED DESCRIPTION OF THE PREFERRED EMBODIMENTS

Figure 1:
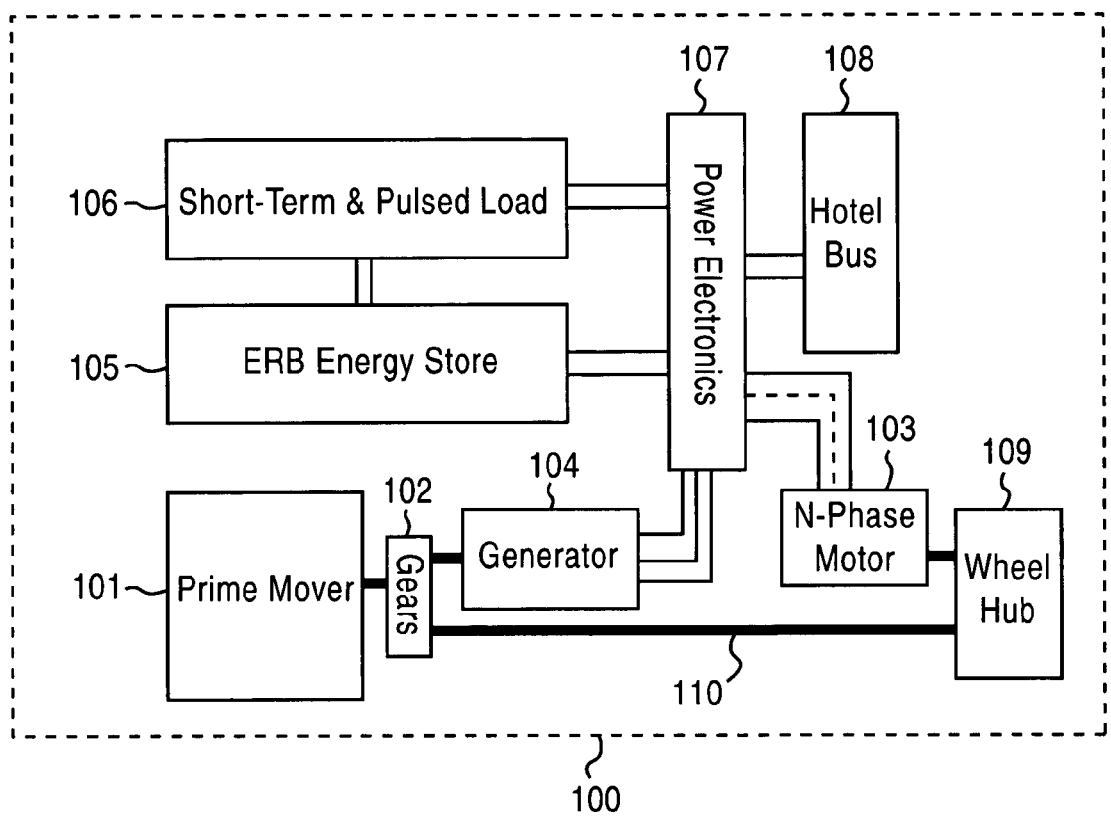
FIG. 1 is a block diagram of a hybrid electric vehicle platform power distribution system including an electronically reconfigurable battery according to an embodiment of the present invention.

The term "star" configuration refers to novel battery configurations having 2 or more battery arms, which will be understood from the description below and the drawing figures. The "H" configuration refers to a "star" configuration with only 4 arms and is a subset of star configurations. Star configurations are not limited in the number of arms they can have.

Dependent on the system configuration, common modules can be configured into multiple arms with positive or negative high voltage output with High Voltage Steering diode or HV Steering diode switch matrixes and with one or multiple inner starring and disconnect switch matrixes surrounding common hub parallel connection.

For simplicity sake, FIGS. 7-8 show a star configuration with 4 arms or chains of strings of modules depicted in FIGS. 1-6. However, the number of arms in these exemplary star configurations could have been 8, 9 or 10 arms or higher. In fact, it is contemplated that the present invention could be implemented with 1000 or more arms.

As shown in FIG. 1, a hybrid vehicle platform power distribution system 100 includes a prime mover 101 (e.g., diesel engine, gas turbine, fuel cell, etc.) coupled to the vehicle transmission (gears) 102, and an n-phase electric motor 103 coupled directly to the drive wheels of the vehicle 109. The gears also are coupled to a generator 104 for recharging the electrical energy storage (ERB energy store) 105, for example, during regenerative vehicle braking and during low power prime mover operation. The ERB energy store 105 functions to power the n-phase motor 103 for vehicle load leveling and/or silent mobility operation, and also is used to provide power to various short-term and pulsed load devices 106. Power electronic circuitry 107 controls the reconfiguration of the ERB, the interfacing between the generator 104, motor 103, ERB store 105, and short-term and pulsed loads 106, as well as providing appropriate bus voltage to a voltage bus (hotel bus) 108.

Figure 2:
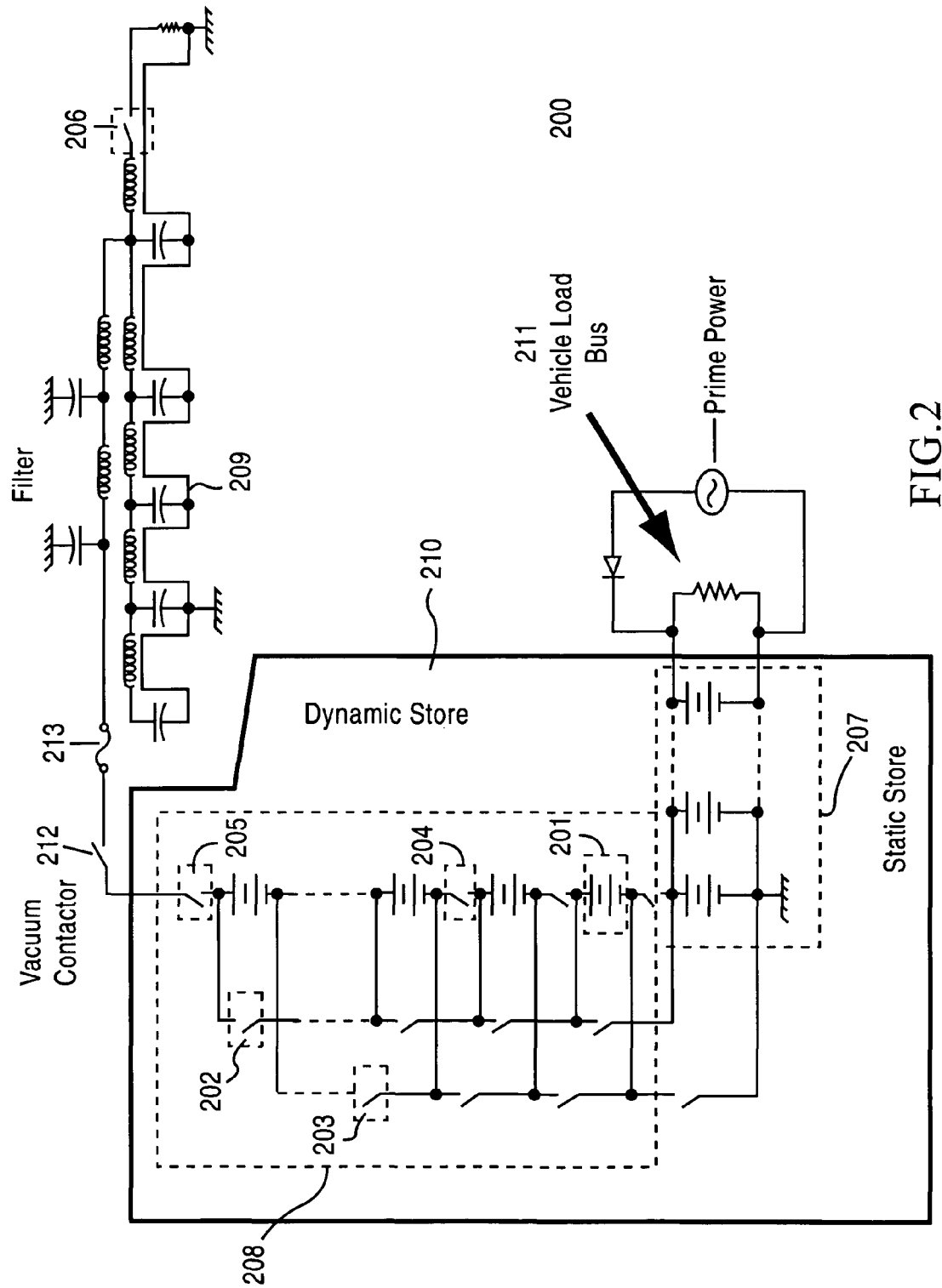
FIG. 2 is a schematic diagram of an electronically reconfigurable battery according to an embodiment of the present invention, adapted for use with an electromagnetic armor (EMA) system for a combat hybrid electric vehicle and other platforms.

As shown in FIG. 2, an electronically reconfigurable battery 200 according to the first embodiment of the invention includes a number of battery modules 201. An example of such a battery module is an Ultralife® lithium polymer rechargeable battery module (e.g., UBC44 or UBC38). Other candidate modules include, but are not limited to, SAFT HP cells (such as HP 12, HP 6, and HP 18650).

The battery 210 includes a number of modules that are permanently configured in parallel with each other (static store) 207 and connected to the vehicle load bus 211, which powers the electric motor. Other modules (dynamic store) 208 can be switched between parallel configuration to support the vehicle load bus 211, and a series configuration to charge the EMA capacitor bank 209 (or other short-term or pulsed load not shown). The electronic reconfiguration of the dynamic store modules 208 requires three switches per module.

An erectable battery module 201 is associated with battery isolation switches 202 and 203, and a series switch 204. All switches (with the exception of the output switch 205) need only block the voltage of a single battery module and open at near zero current (for capacitor charging) in normal operation. Transient conditions during erection and de-erection are controlled by passive snubbing. Reconfiguration can be accomplished in less than 1 ms using standard off-the-shelf solid state switches such as integrated gate bipolar transistors (IGBT) or Metal Oxide Field Effect Transistors (MOSFET).

Switches 202, 203, and 204 can be rated for the module voltage (such as 1 kV) only. Switch 205 is an output switch that is rated for the full output of the ERB (e.g., 10 kV and 100 amps), and can be implemented as a series stack of the same switches used for switches 202, 203, and 204. A vacuum contactor 212 and fuse 213 are placed in series with the output switch 205 to provide fault protection and charge interrupt. All switches are preferably opto-isolated, with gate power drawn from their associated adjacent battery modules. Switch 206 is high-voltage high-current closing switch, and can be either a vacuum switch or a solid state switch. Switch 206 discharges the EMA capacitor bank into the EMA load.

With some 8,000 cells necessary to make up a 30 kW-hr vehicle battery pack, voltages would be available in multiples of the distribution bus voltage up to 30 kV. Furthermore, each of these voltage levels is available with the full power capability of the battery pack. Construction techniques used in the HP18650 are scaleable to larger or smaller individual cells so that optimization for the particular application is possible.

EXAMPLE

Assuming a 20-ton class vehicle and extrapolating from CHPS requirements, a conceptual design of an ERB for a hybrid electric vehicle with an EMA system has the following requirements: 1) Deliver up to 400 kW to the vehicle bus at 1 kV in parallel operation; 2) Recharge a 150-kJ capacitive store to 10 kV in 300 milliseconds; and 3) Support 30-45 minute silent operation at 80 kW. These requirements mandate the use of very high energy and power density batteries. Two candidate batteries are the HP series of lithium ion batteries being developed by SAFT and the lithium polymer batteries produced by Ultralife Batteries, Inc. for use in cell phones. The SAFT batteries have a slight advantage in usable power density and packaging for military use, whereas the Ultralife batteries have an advantage in cost (0.15-0.2 cents/J, 5-8 cents/Wpk, owing to volume production) and a potential for more compact packaging (prismatic) in ERB service.

The ERB system in this case constitutes only ⅓ of the total battery for erected (dynamic) operation. The remaining ⅔ of the store (static) is dedicated to load leveling and silent mobility. The total capacity of ~290 MJ (80 kW-hr) accommodates silent mobility requirements. With only ⅓ (90 MJ, 25 kW-hr) of the total capacity configured for on-command electronic erection and de-erection, the vehicle energy storage system maintains its load leveling and silent operation capability even when the EMA is active.

54 series×7 parallel Ultralife Model UBC44106102 polymer batteries are assembled into 200-volt stacks (378 cells per pack), in the static store. Five of these packs are placed in series to obtain an output voltage equal to that of the vehicle bus and constitute a module. Two such modules in parallel make up the static store (3780 cells total). In the dynamic portion of the store, the UBC383562 cell is used because of its heavier tabbing and proven current capability. The 200-volt packs in this case consist of 54 series×4 parallel cells (216 total). Five such packs make up an erectable module and there are 10 modules, thus providing 10 kV on command for EMA store charging (approximately 90 MJ; 10,800 total cells). A dynamic module will incorporate all necessary switches, isolation and thermal management hardware. The total battery volume in the static store is approximately 0.18 m3 and the accessories are expected to add another 0.135 m3 for a total volume of approximately 0.315 m3 and a mass of 620 kg. The dynamic store is less efficient volumetrically, because for the need to insulate for the 10 kV momentary operation and thermal stress associated with MW-class power for even a few seconds. We expect a battery volume of 0.089 m3 with a total of volume of 0.314 m3 and a mass of 500 kg, when accessories are included, for the dynamic store. These total to a volume of 0.629 m3 and mass of 1120 kg for the entire vehicle battery pack (~300 MJ).

Figure 3:
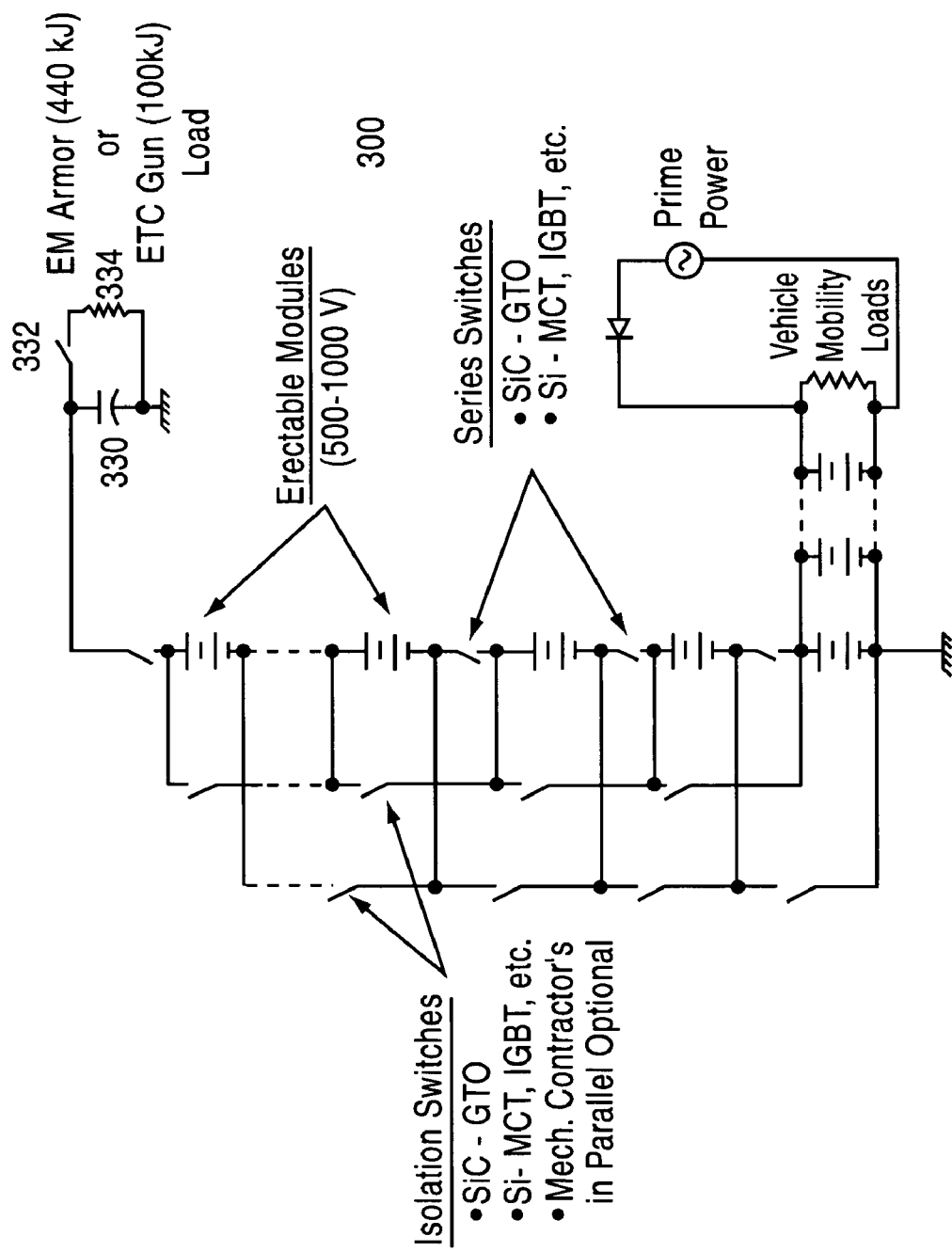
FIG. 3 is a schematic diagram of an electronically reconfigurable battery according to an embodiment of the present invention, adapted to a generic use.

FIG. 3 shows a generic application of the ERB system 300 according to an embodiment of the invention, wherein the ERB charges an energy store represented by a capacitor 330, which is discharged via a switch 332 into a load represented by a resistor 334.

Figure 4:
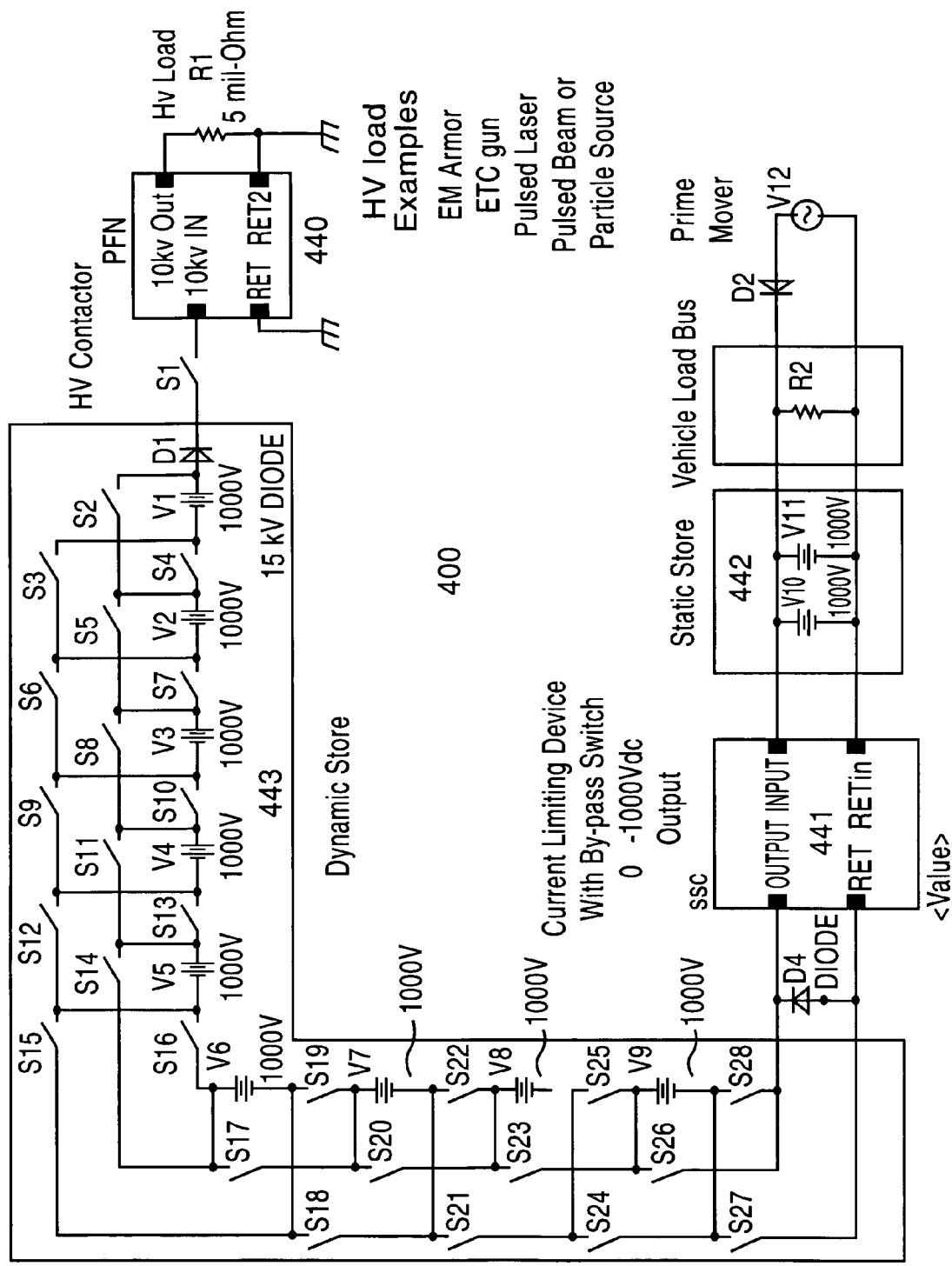
FIG. 4 is a schematic diagram of an electronically reconfigurable battery including a current limiting section according to an embodiment of the present invention, adapted for use with an electromagnetic armor (EMA) system for a combat hybrid electric vehicle and other platforms.

FIG. 4 shows another embodiment 400, which has the same configuration as FIG. 2, with the PFN 440 represented by a block, and further including a current limiting device 441 inserted between the static 442 and dynamic 443 portions of the battery.

Figure 5:
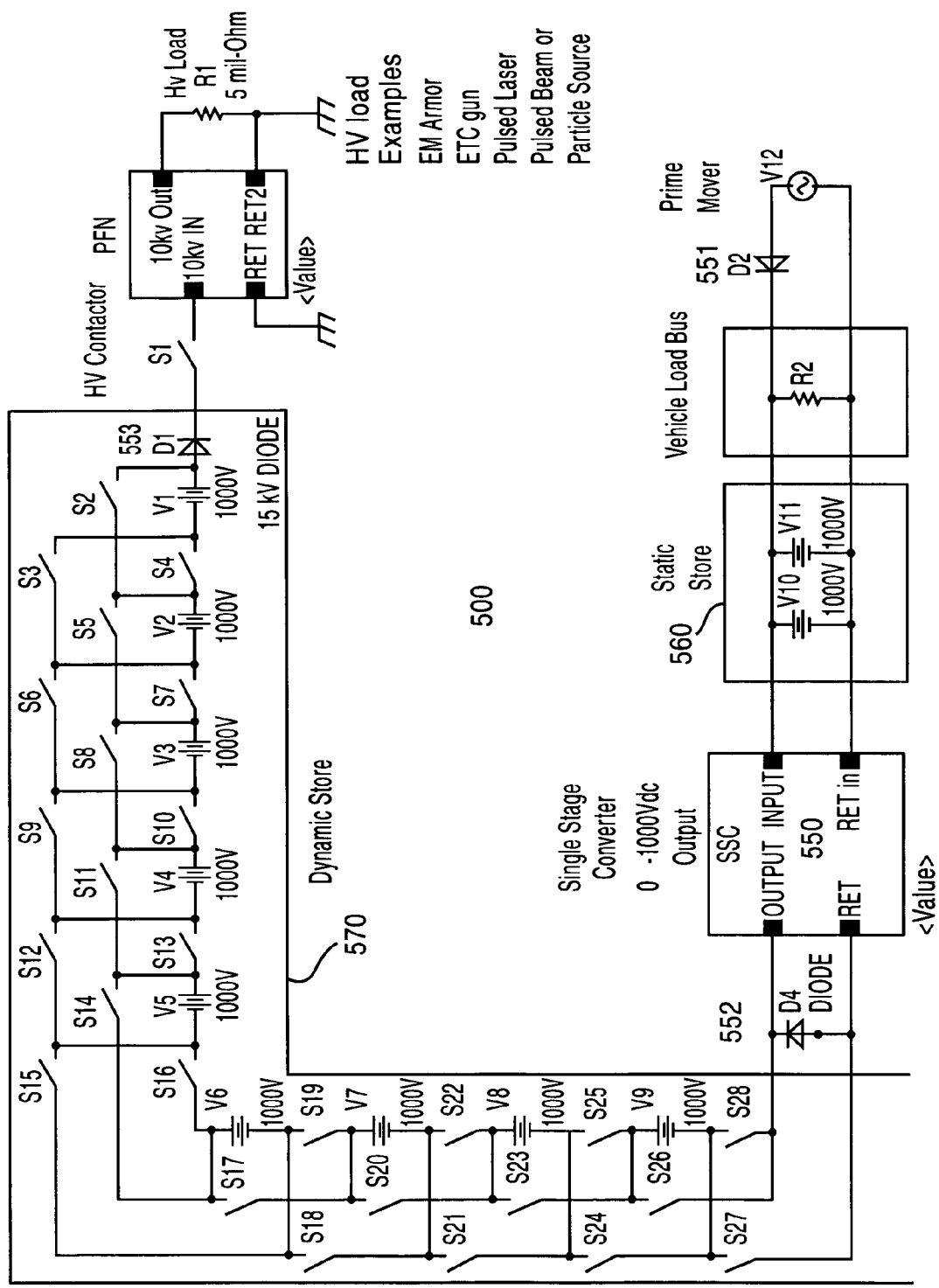
FIG. 5 is a schematic diagram of an electronically reconfigurable battery including a single stage converter (SSC) according to an embodiment of the present invention, adapted for use with an electromagnetic armor (EMA), ETC Gun, pulsed laser, pulsed beam, energy or particle source systems for a combat hybrid electric vehicle and other platforms.

FIG. 5 shows another embodiment 500, which has the same configuration as FIG. 4 except with a SSC 550 replacing the current limiting device, and diodes 551, 552 and 553 added as steering diodes. The charge sequence is different from the first and second embodiments, in that a sequential step charge mode of operation can be used with the circuit of FIG. 5, also the list of applicable loads is expanded and can be applied to all embodiments.

Figure 6:
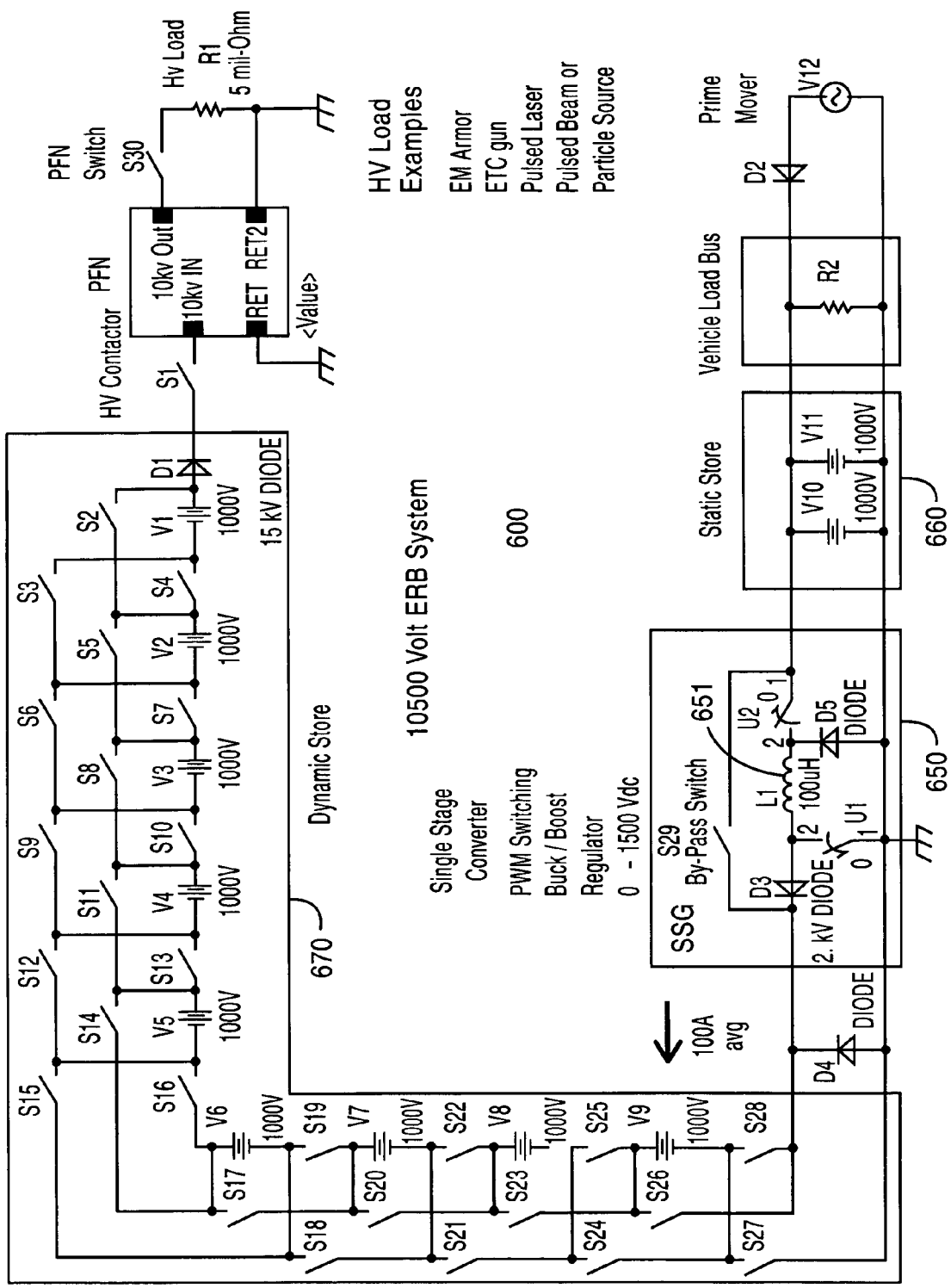
FIG. 6 is a schematic diagram of an electronically reconfigurable battery including a single stage buck/boost converter section (SSC) according to an embodiment of the present invention, for use with an electromagnetic armor (EMA), ETC Gun, pulsed laser, pulsed beam, energy or particle source systems for a combat hybrid electric vehicle and other platforms.

FIG. 6 is an alternate example of another embodiment of the present invention. The ERB 600 is configured for a sequential step charge mode using a Buck/boost PWM single stage converter (SSC) type. The high-speed semiconductor switches U1, U2 can be bipolar transistors, MOSFETs, IGBTS, SCR and other power semiconductor switches. Other converter types such as buck, boost and other electronic converter topologies are similar in operation and also can be used for the switching regulator.

Example of Sequential Step Charge Operation

The sequential step charging operation mode using a single stage converter (SSC) as shown in FIGS. 5 and 6 is described below.

The best location for the single stage converter 650 is between the static 660 and dynamic 670 portion of the battery as this limits the voltage stresses seen by the internal components, but the SSC 650 can be located anywhere within the series-connected loop that starts with the static store 660 portion of the battery and ends with the PFN capacitor bank 680. A single inductor 651, non-isolated buck/boost or interleaved buck/boost configuration is the preferred topology. A by-pass switch S29 will normally be employed in this location to connect the dynamic portion 670 of the battery to the static portion 660 in a low loss manner, bypassing the SSC 650 in the parallel mode of operation.

In the series sequential charge operation, the PFN capacitor bank 680 is charged in ten (10) sequential steps.

First, the switches of the dynamic store portion 670 of the battery are all opened except for the positive isolation set of switches; the SSC 650 is now directly connected between the static portion 660 of the battery and the PFN capacitor 680.

Next the SSC 650 is turned "ON" and charges the PFN capacitor bank 680 at a controlled current (100 A) to approximately slightly more (1010-1200V) than the single battery module voltage (1000V) at which point it shuts down momentarily and a battery module is erected in series with the SSC 650 by selectively opening and closing the appropriate switches. The SSC 650 is turned back "ON" and PFN capacitor bank 680 charges at the controlled current until the SSC 650 reaches its controlled output voltage set point at which time it will shut off again.

The stored voltage in the PFN capacitor bank 680 is now V (SSC)+battery V1 (2010-2200V).

The cycle is repeated until all the batteries with the SSC 650 are erected in series, or the desired stored PFN voltage set point is reached (V PFN=(V (SSC)+batteries V1+V2+V3+V4+V5+V6+V7+V8+V9=(900-10200V)). By using this method the power processing capability required of the SSC 650 is reduced from the system level power delivered (10 kV@100 A) by the number of battery stages erected plus one (in this case 10) for a (SSC) nominal power rating of 1000 v@100 A or 100 kW. This reduces the converter size by a factor of more than ten because the converter has ⅒ of the voltage stresses and no longer needs an isolation or step-up transformer. PFN voltage regulation is finer and smoother than the first embodiment; however the first embodiment is the smallest physically, the most robust and is the cheapest to build.

Normal Operation

As shown in FIGS. 5 and 6, the dynamic part of the battery store is connected as nine parallel 1000 volt batteries (V1-V9) connected in parallel with the main or static portion (V10-V11) of the battery system. In normal operation, negative isolation switches S3, S6, S9, S12, S15, S18, S21, S24, S27 and positive isolation switches S2, S5, S8, S11, S14, S17, S20, S23 and S26 are closed, and bypass switch S29 in the SSC is closed. Battery series switches S4, S7, S10, S13, S16, S19, S22, S25 and S28 as well as HV contactor S1 are open. The battery now has 11 parallel sections to power a vehicle.

ERB Dynamic Operation

The ERB dynamic section 670 is erected in 10 steps, which are now explained with reference to FIG. 6.

Step one—Converting from Static to Dynamic mode and Single Stage converter (SSC) charging of the Pulse Forming Network (PFN) from 0 to 1200 volts The shift from static to dynamic operation begins with the SSC 650 bypass switch S29 and all negative isolation and series connected switches being opened. All positive isolation switches are kept closed and HV contactor S1 switches from being opened to closed.

The SSC 650 then switches to a charge mode and begins charging the PFN storage capacitor bank 680 at an average current of 100 Amperes. The current flow path is through positive switches S2, S5, S8, S11, S14, S17, S20, S23 and S26, which then forward bias diode D1, allowing the current to flow through HV contactor S1 into the PFN capacitor bank 680. At a PFN charge voltage of 1200 volts, the SSC 650 stops charging and goes into an idle mode for the Step 2 ERB configuration change. Current flowing into PFN stops and goes to zero.

SSC Charge and Idle Modes of Operation

In the charge mode of operation, for SSC 650 Voltage Output (Vout) range from zero to approximately 1000 volts, the SSC is in a step-down buck regulator mode with solid state high speed semiconductor switch U2 open and solid state high speed semiconductor switch U1 operating in a variable duty cycle Pulse Width Modulation (PWM) scheme to maintain an average output current of 100 A (I out). For the Vout range from 1000-1200 volts, the SSC 650 shifts to a step-up boost mode and U1 is now on at a 100% duty cycle, and U2 is PWM modulated to control the output current.

When Vout reaches 1200 volts, the SSC 650 is put in idle mode and U2 is then turned on at 100% PWM and the SSC voltage output and current drop to zero. The loss of the SSC Vout of 1200 volts results in reverse biasing diode D1 as the voltage difference between the PFN voltage and the dynamic store section is −1200 volts. The current flow through the dynamic store battery section 670 falls to zero due to the reverse biasing of Diode D1. Average current in the SSC's inductor is maintained by PWM modulating U1 while U2 is 100% on. At this point the process proceeds to step two.

Step two—Erecting first battery stage-PFN charging voltage of 1200-2200 volts

SSC starts the step 2 cycle in IDLE mode, Vout and Iout are at zero, negative switches S3, S6, S9, S12, S15, S18, S21, S24, and S27 are open. Switch S2 now opens and switch S4 now closes, connecting battery V1 in series with the SSC output. The SSC 650 now switches back to CHARGE mode and charges the PFN from 1200 volts to 2200 volts by the series voltage addition of SSC Vout and V1 (1000V). Again Vout only varies over a range from 0-1200 Volts. At PFN charge voltage of 2200 volts, the SSC 650 goes back into IDLE mode for the Step 3 ERB configuration change.

The amount of time needed for the SSC 650 to be in the IDLE mode is determined by the time required for the diode D1 current to fall to zero and the time required to set the ERB switches to the new configuration. Total IDLE time per step change is estimated to be in the 10-100 microsecond range.

Step 3—Erecting second battery stage-PFN voltage 2200-3200 volts: SSC starts step 3 cycle in IDLE mode, Vout and Iout are at zero, negative switches S3, S6, S9, S12, S15, S18, S21, S24, and S27 are open. Switch S2 is open and switch S4 is closed. Switch S5 is now opened and switch S7 is now closed, connecting batteries V1 and V2 in series with the SSC output. The SSC 650 now switches back to CHARGE mode and charges the PFN from 2200 to 3200 volts by the series voltage addition of SSC Vout and V1, V2 (2 kV). Again, Vout only varies over a range from 0-1200 volts. At PFN charge voltage of 3200 volts, the SSC goes back into IDLE mode for the Step 4 ERB configuration change.

Step 4—Erecting Third battery stage-PFN voltage 3200-4200 volts: The SSC starts step 4 cycle in the IDLE mode, Vout and Iout are at zero, negative switches S3, S6, S9, S12, S15, S18, S21, S24, S27 are open. Switches S2, S5 are open and switches S4, S7 are closed. Switch S8 is now opened and switch S10 is now closed, connecting batteries V1, V2, and V3 in series with the SSC output.

The SSC 650 now switches back to CHARGE mode and charges the PFN from 3200 to 4200 volts by the series voltage addition of SSC Vout and V1, V2, V3 (3 kV). Vout varies over a range from 0-1200 volts. At PFN Charge voltage of 4.2 kV, the SSC goes back into IDLE mode for the Step 5 ERB configuration change.

Step 5—Erecting Fourth battery stage-PFN voltage 4200-5200 volts: SSC starts step 5 cycle in IDLE mode, Vout and Iout are at zero, negative switches S3, S6, S9, S12, S15, S18, S21, S24, S27 are open. Switches S2, S5, S8 are open and switches S4, S7, S10 are closed. Switch 14 is now opened and switch 16 is now closed, connecting batteries V1, V2, V3, and V4 in series with the SSC output.

The SSC 650 now switches back to CHARGE mode and charges the PFN from 4200 to 5200 volts by the series voltage addition of SSC Vout and V1, V2, V3, V4 (4 kV). Vout varies over a range from 0-1200 volts. At PFN Charge voltage of 5200 Volts, the SSC goes back into IDLE mode for the Step 6 ERB configuration change.

Step 6—Erecting Fifth battery stage-PFN voltage 5200-6200 volts: SSC 650 starts step 6 cycle in IDLE mode, Vout and Iout are at zero, negative switches S3, S6, S9, S12, S15, S18, S21, S24, S27 are open. Switches S2, S5, S8, and S11 are open and switches S4, S7, S10, and S13 are closed. Switch 14 is now opened and switch 16 is now closed, connecting batteries V1, V2, V3, V4, and V5 in series with the SSC output.

The SSC 650 now switches back to CHARGE mode and charges the PFN from 5200 to 6200 volts by the series voltage addition of SSC Vout and V1, V2, V3, V4, V5 (5 kV). Vout varies over a range from 0-1200 volts. At PFN Charge voltage of 6200 Volts, the SSC goes back into IDLE mode for the Step 7 ERB configuration change.

Step 7—Erecting Sixth battery stage PFN voltage 6200-7200 volts: SSC 650 starts step 7 cycle in IDLE mode, Vout and Iout are at zero, negative switches S3, S6, S9, S12, S15, S18, S21, S24, S27 are open. Switches S2, S5, S8, S1 and S14 are open and switches S4, S7, S10, S13 and S16 are closed. Switch 17 is now opened and switch 19 is now closed, connecting batteries V1, V2, V3, V4, V5 and V6 in series with the SSC output.

The SSC 650 now switches back to CHARGE mode and charges the PFN from 6200 to 7200 volts by the series voltage addition of SSC Vout and V1, V2, V3, V4, V5, V6 (6 kV).

Vout varies over a range from 0-1200 volts. At PFN Charge voltage of 7200 Volts, the SSC goes back into IDLE mode for the Step 8 ERB configuration change.

Step 8—Erecting Seventh battery stage PFN voltage 7200-8200 volts: SSC 650 starts step 8 cycle in IDLE mode, Vout and Iout are at zero, negative switches S3, S6, S9, S12, S15, S18, S21, S24, S27 are open. Switches S2, S5, S8, S11, S14 and S17 are open and switches S4, S7, S10, S13, S16 and S19 are closed. Switch 20 is now opened and switch 22 is now closed, connecting batteries V1, V2, V3, V4, V5, V6 and V7 in series with the SSC output.

The SSC 650 now switches back to CHARGE mode and charges the PFN from 7200 to 8200 volts by the series voltage addition of SSC Vout and V1, V2, V3, V4, V5, V6, V7 (7 kV).

Vout varies over a range from 0-1200 volts. At PFN Charge voltage of 8200 Volts, the SSC goes back into IDLE mode for the Step 9 ERB configuration change.

Step 9—Erecting Eighth battery stage PFN voltage 8200-9200 volts: SSC 650 starts step 9 cycle in IDLE mode, Vout and Iout are at zero, negative switches S3, S6, S9, S12, S15, S18, S21, S24, S27 are open. Switches S2, S5, S8, S11, S14, S17 and S20 are open and switches S4, S7, S10, S13, S16, S19 and S22 are closed. Switch 23 is now opened and switch 24 is now closed, connecting batteries V1, V2, V3, V4, V5, V6, V7 and V8 in series with the SSC output.

The SSC 650 now switches back to CHARGE mode and charges the PFN from 8200 to 9200 volts by the series voltage addition of SSC Vout and V1, V2, V3, V4, V5, V6, V7, V8 (8 kV).

Vout varies over a range from 0-1200 volts. At PFN Charge voltage of 9200 Volts, the SSC goes back into IDLE mode for the Step 10 ERB configuration change.

Step 10—Erecting Ninth battery stage PFN voltage 9200-10200 volts: SSC 650 starts step 10 cycle in IDLE mode, Vout and Iout are at zero, negative switches S3, S6, S9, S12, S15, S18, S21, S24, S27 are open. Switches S2, S5, S8, S11, S14, S17, S20 and S23 are open and switches S4, S7, S10, S13, S16, S19, S22 and S25 are closed. Switch 26 is now opened and switch 28 is now closed, connecting batteries V1, V2, V3, V4, V5, V6, V7, V8 and V9 in series with the SSC output.

The SSC 650 now switches back to CHARGE mode and charges the PFN from 9200 to 10200 volts by the series voltage addition of SSC Vout and V1, V2, V3, V4, V5, V6, V7, V8, V9 (9 kV). Vout varies over a range from 0-1200 volts. At PFN full charge voltage of 10200 Volts, the SSC current drops to zero and then acts as a voltage regulator maintaining the charge in the PFN at the proper voltage.

Step 11—De-Erecting:

Just prior to firing the PFN capacitor bank 680, the SSC 650 is shut off and all the switches are opened. In the event of a short, the HV contactor S1 is opened and the SSC 650 is shut off and all of the switches are opened.

FIG. 7 depicts an alternative embodiment of the invention 700. In this embodiment, the system consists of several ERB arms 701, 702, 703, and 704, configured in a "star" configuration 712. The redundancy of this configuration has several advantages including fault tolerance. Switch steering matrices are connected to both the inner 713 and outer portions of the star configurations. The ERB arms are connected at one end to the parallel low voltage or baseline voltage 705 and at the other end to the variable high voltage load 706. Each of the two ends of an ERB arm (e.g. 701) has a bi-directional power output connection. The energy from the base side connection 713 of each arm (e.g. 701) is fed in parallel to the center switch matrix to provide traction power for the main system load. The outer switch matrix consists of positive diode switch matrix 710, negative diode matrix 711 and switch 708 and switch 714 located below the capacitor below storage capacitor 707.

Diode switches 710 and 711 are voltage controlled switches that are turned on when the differential voltage between the arm output and the capacitor terminal forward bias the voltage across the diodes. The diode disconnect when the voltage differential between the capacitor and the individual arm output results in reverse biasing if one arm or both arms output voltage are below the capacitor voltage the one or both arms are disconnected by the diodes.

Normal operation is when the modules are de-erected and disconnected causing diode switch matrices 710,711 to be back biased resulting in turning off the switches, then switch 708 and the other switch by base are then turned on to connect the energy stored in capacitor 707 to be transferred to the load.

The energy stored in each arm can also be directed out the opposite end 710 to be directed through the VHV connection into the outer switch matrix 708. Additionally the energy flow is in discrete energy packets that are time multiplexed on the VHV connection side while maintaining a continuous connection and energy flow through the base or parallel connection side 713. Additionally, energy from one ERB arm (e.g. 701) can be transferred to another ERB arm (e.g. 702). A simple switching algorithm and a three-switch one diode configuration can be used to guarantee no catastrophic battery or file failure due to mistiming of the high-speed switching. This is accomplished by switching off or opening all of the positive or negative rail switches and then using just one series switch connection and one required steering diode per module to erect and de-erect the batteries or capacitors that are in series.

Alternatively, the base switch matrix can be set to "ON" (i.e. the switch closed) at all times by replacing it with hard wired parallel connections of the base voltage terminals. The invention allows simple scaling by the simple addition of more modules without any rewiring. Sophisticated ERB systems with complete redundancy of the ERB star and multiple star configurations are easily configured by switched in and cross connected at the base and or at the VHV level matrix levels.

In an alternative embodiment, for the purposes of redundancy and reliability, the VHV outputs are steered in parallel operation through a simple VHV diode steering array. This allows complete or partial failure of one or more ERB arms 701, 702, 703, or 704 while maintaining function of the entire system. For instance the system 700 depicted in FIG. 7 can suffer a complete failure of one plus (e.g. 701) and one minus output ERB arm (e.g. 702) and still meet most of the requirements of the VHV load. When used for powering an electric or gas-electric hybrid, the system can suffer the loss of three ERB arms before loosing traction or moving capability.

As can be seen from FIG. 8, each of the ERB arms 801 is comprised of several ERB modules 802. Each ERB module 802 contains an energy storage device 803, such as a battery or capacitor, and piece of the distributed modular bus structure and steering array. It would be understood by one skilled in the art that any of the modular diagrams disclosed in FIGS. 1-6 could be used to construct an ERB arm.

FIG. 9 illustrates another embodiment of the invention. Each ERB arm 910 consists of a scalable number of ERB modules 920. In such an embodiment each module 920 contains an energy source, part of the modular distributed series and parallel switch matrix and bus bar system, and the fusing and protection as well as the control systems. While the preferred embodiment has two input power ports 960 and two output power ports 950, any number of power ports could be used. The ERB arms are scaled by connecting an output port 950 of a first module 920 to an input port 960 of a second module 930 to create a module string. This can be done for a plurality of ERB modules with the final module 970 in the string connecting to the VHV steering array 940. Very high voltages can be achieved in this fashion. Because this application of the ERB modules is scalable, the number of modules per ERB arm is application driven and, in a multiple arm ERM "star" configuration system, each arm may have a different number of modules and have a different polarization of output voltage to satisfy a wide variety of load requirements.

In examples shown in FIGS. 7 and 8 and described above, 2 identical sets of one positive and one negative stackable module arms were chosen with the positive 5000 volt arms and HV outputs shown on the left and the negative 5000 volt arms and HV outputs shown on the right. One half of high voltage steerable diode switch matrix was added to each side so any number of arms can be added in parallel.

The purpose of splitting the module chain or arms in half was to reduce the number of modules per arm connected to a common center parallel base core buss thus reducing the battery system ESR (Equivalent Series resistance) by a factor of 4 in the parallel mode and increase reliability by having 4 parallel arms vs. 2 arms. Also by splitting into positive and negative arms the differential voltage is double the voltage to reference to ground simplifying insulation systems Not shown are that multiple high voltage switch matrixes and loads can be shared among multiple stars. The Low Voltage parallel arm end (base in FIG. 7) are connected to a common star low voltage buss or battery system and outer end or HV end of each arm can be connected to a single, or multiple outer switch high voltage switch matrixes, An 8 arm star (star-1) can be implemented by adding four more arms to the H configuration with 8 arms of stackable modules with 4 arms connected to HV matrix—one connected to pulsed laser system, arms 5-6 connected to HV Switch matrix—2 and Pulsed Microwave system, arms 7-8 connected HV traction system.

Thus, additional stars can add their arms outputs and be cross-connected at both the inner outer hubs or arm ends to the Star-1 for redundancy or more power.

Thus, a number of preferred embodiments have been fully described above with reference to the drawing Figs. Although the invention has been described based upon these preferred embodiments, it would be apparent to those of skill in the art that certain modifications, variations, and alternative constructions could be made to the described embodiments within the spirit and scope of the invention. Further, as should be apparent to one skilled in the art after reviewing this patent document, the modular battery system of the present invention could be useful in innumerable other applications not listed here.

The invention claimed is:

1. An electronically reconfigurable battery, comprising:
   a first plurality of battery modules configured in a star configuration;
   a plurality of switches interconnecting said plurality of battery modules such that a selectable number of said plurality of battery modules may be connected either in a series configuration or in a parallel configuration, as a result of placing selected switches of said plurality of switches in open states or closed states;
   an output switch for connecting a first output terminal of said battery to a first load;
   a series current limiting device inserted in circuit with the partially or sequentially erected battery so as to limit DC current; and
   wherein said charge current limiting device comprises a single stage converter (SSC) whose output voltage is limited to approximately the battery module voltage level.

2. An electronically reconfigurable battery as recited in claim 1, wherein each of said plurality of battery modules is coupled with at least three of said plurality of switches as follows:
   a first switch which connects said each battery module in series with an adjacent battery module when closed, and
   second and third switches which connect said each battery module in parallel with an adjacent battery module when closed, wherein when said first switch is closed, said second and third switches are open, and when said first switch is open, said second and third switches are closed.

3. An electronically reconfigurable battery as recited in claim 1, further comprising:
   a second plurality of battery modules, each of said second plurality of battery modules being connected in parallel with each other, said first plurality of battery modules being selectively connected to said second plurality of battery modules through at least two of said plurality of switches.

4. An electronically reconfigurable battery as set forth in claim 3, further comprising a second output terminal for connecting said second plurality of battery modules to a second load.

5. An electronically reconfigurable battery as set forth in claim 4, wherein said second load comprises a motor for propelling a vehicle or vessel.

6. An electronically reconfigurable battery as set forth in claim 5, wherein said first load comprises an electromagnetic armor system.

7. An electronically reconfigurable battery as set forth in claim 1, wherein said plurality of switches comprises a plurality of integrated gate bipolar transistor (IGBT) switches.

8. An electronically reconfigurable battery as set forth in claim 1, wherein said plurality of switches comprises a plurality of metal oxide field effect transistor (MOSFET) switches.

9. An electronically reconfigurable battery as set forth in claim 7, where in said plurality of IGBT switches comprise opto-isolated switches.

10. An electronically reconfigurable battery as set forth in claim 8, wherein said plurality of MOSFET switches comprise opto-isolated switches.

11. An electronically reconfigurable battery as recited in claim 1, wherein said reconfigurable battery can be reconfigured to match a hybrid vehicle with a variable DC main bus voltage used for a first level of reliability and to shorter life higher power mode.

12. An electronically reconfigurable battery as described in claim 1, wherein DC current is limited by selection of electrochemical discharge characteristics of the selected battery technology.

13. An electronically reconfigurable battery as described in claim 1, further comprising a series current limiting device inserted in circuit with the fully erected battery so as to limit DC current.

14. An electronically reconfigurable battery as described in claim 13, wherein said current limiting device comprises a resistive or inductive component in a resistance-capacitance (RC) or inductance-capacitance (LC) current limiting circuit.

15. An electronically reconfigurable battery as described in claim 1, wherein a bypass switch is used to connect the input to the output of the SSC circuit to directly connect the dynamic store portion of the battery with the static portion of the battery.

16. An electronically reconfigurable battery as described in claim 1, wherein the SSC comprises an electronic DC-DC converter whose input circuit is connected to the static portion of the battery and whose output is connected to the first stage of the dynamic section of the battery.

17. An electronically reconfigurable battery as described in claim 1, wherein the SSC comprises an electronic DC-DC converter whose input circuit is connected to a suitable DC source other than the static portion of the battery and the output is connected to the first stage of the dynamic section of the battery.

18. An electronically reconfigurable battery as described in claim 1, wherein the SSC comprises an electronic converter whose circuit topology is chosen from the group consisting of Buck, Boost, Buck/Boost, step-up, step-down, resonant, isolated, non-isolated, cyclo-converter, and matrix converter.

19. An electronically reconfigurable battery as described in claim 1, wherein the SSC comprises an electronic AC-DC converter whose input circuit is connected to a suitable AC source and whose output is connected to the first stage of the dynamic section of the battery.

20. An electronically reconfigurable battery as described in claim 1, wherein said battery is adapted for use in high to extreme peak to average power output pulsed power applications and platforms for non-vehicular applications.

21. An electronically reconfigurable battery as described in claim 1, wherein each arm of the configuration comprises a plurality of ERB modules which can be strung together based on the needs of the particular application.

22. A reconfigurable battery system comprising:
- a plurality of battery arms, each battery arm comprising a plurality of battery modules which are electronically reconfigurable to selectively operate in parallel or series;
- a center switch matrix coupled with a first output terminal and each of said battery arms, and configured to selectively connect one or more of said battery arms with said first output terminal;
- an outer switch matrix coupled with a second output terminal and each of said battery arms, and configured to selectively connect one or more of said battery arms with said second output terminal;
- a series current limiting device inserted in circuit with said plurality of battery arms; and
- wherein said current limiting device comprises a single stage converter (SSC) whose output voltage is limited to approximately the battery module voltage level.

23. The reconfigurable battery system as recited in claim 22, wherein said center switch matrix couples the first output terminal with each said battery arm on a first battery arm side thereof, and said outer switch matrix couples the second output terminal with each battery arm on a second battery arm side thereof.

24. The reconfigurable battery system of claim 22, wherein the plurality of battery arms comprises a first battery arm, a second battery arm, a third battery arm and a fourth battery arm.

25. The reconfigurable battery system of claim 22 wherein each battery arm comprises a scalable number of battery modules.

* * * * *